United States Patent [19]

Goebel et al.

[11] 4,297,615

[45] Oct. 27, 1981

[54] HIGH CURRENT DENSITY CATHODE STRUCTURE

[75] Inventors: Dan M. Goebel, Santa Monica; James T. Crow, Los Angeles; A. Theodore Forrester, Beverly Hills, all of Calif.

[73] Assignee: The Regents of the University of California, Berkeley, Calif.

[21] Appl. No.: 21,461

[22] Filed: Mar. 19, 1979

[51] Int. Cl.[3] .......................... H01J 1/20; H05H 1/24
[52] U.S. Cl. .......................... 315/111.21; 313/231.31; 313/339; 313/362.1; 315/111.81
[58] Field of Search ............... 315/111.2, 111.3, 111.8, 315/111.9; 250/423 R, 427; 313/231.3, 231.4, 339, 362

[56] References Cited

U.S. PATENT DOCUMENTS

| | | | |
|---|---|---|---|
| 3,440,475 | 4/1969 | Schiller et al. | 313/337 |
| 3,515,932 | 6/1970 | King | 315/111.2 X |
| 3,798,488 | 3/1974 | Pleshivtsev et al. | 313/231 |
| 3,928,783 | 12/1975 | Hosoki et al. | 313/339 X |
| 4,218,633 | 8/1980 | Mirtich et al. | 313/362 |

OTHER PUBLICATIONS

Lafferty, *Boride Cathodes*, Journal of Applied Physics, vol. 22, No. 3, Mar. 1951, pp. 299–309.
Wolski, *Press Sintered Hevaboride Cathodes*, U.N. Fellowship Studies, No. 69–12, Royal Inst. of Tech., Stockholm, Sweden, May 24, 1969.
Kohl, *Handbook of Materials and Techniques for Vacuum Devices*, Reinhold, N.Y., 1967, p. 502.

*Primary Examiner*—Eugene R. La Roche
*Attorney, Agent, or Firm*—Poms, Smith, Lande & Rose

[57] ABSTRACT

A lanthanum hexaboride element, typically of cylindrical configuration, is mounted within a high plasma density cathode enclosure. An inlet is provided to supply gas to the cathode enclosure in the vicinity of the lanthanum hexaboride cathode element, and the element is heated to electron-emitting temperature. A plasma utilization chamber is coupled to receive an electron or plasma stream from the cathode enclosure through an aperture of a suitable size to maintain a relatively high plasma density within the cathode enclosure. The plasma density within the cathode enclosure is preferably above the critical level required for high current emission from the lanthanum hexaboride cathode structure. For example this may be in the order of 3.5 times $10^{12}$ electrons per cubic centimeter for a current density of 10 amperes per square centimeter. The lanthanum hexaboride cathode element is supported on notched graphite rings, and the cathode enclosure is made of tungsten. Exceedingly high currents, of the order of 1000 amperes, and high current densities of the order of 5,000 amperes per square centimeter can be obtained from the exit aperture.

16 Claims, 4 Drawing Figures

U.S. Patent  Oct. 27, 1981  4,297,615
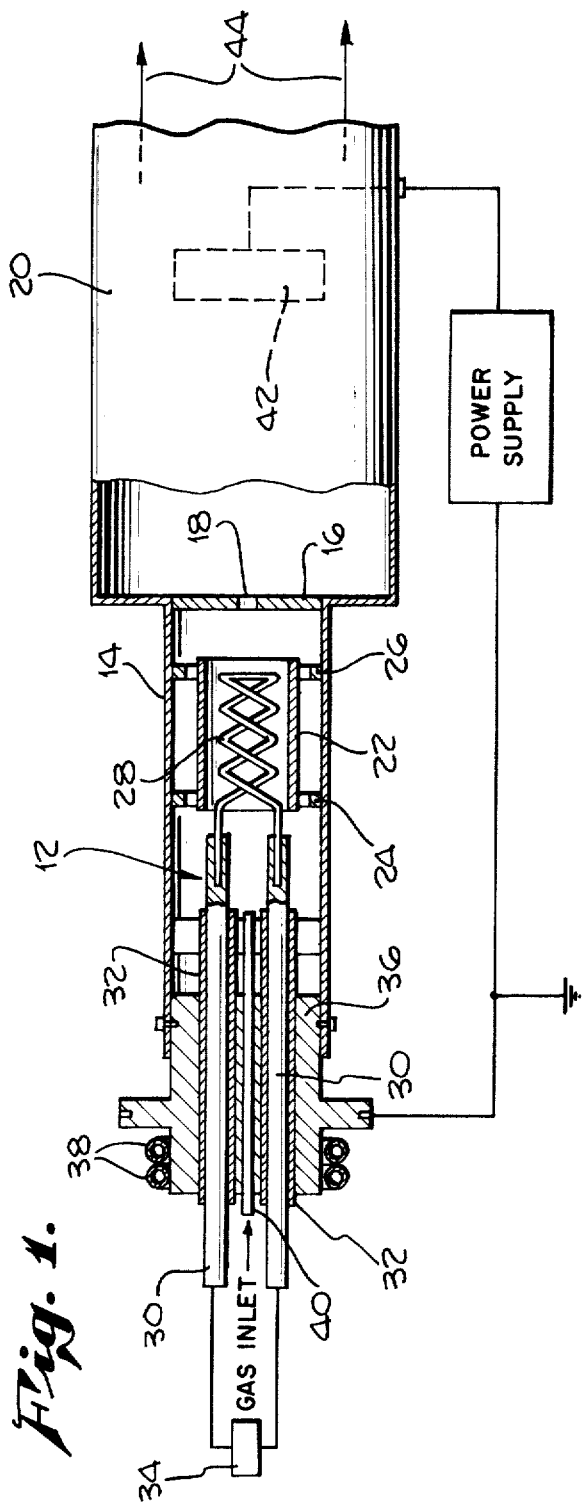
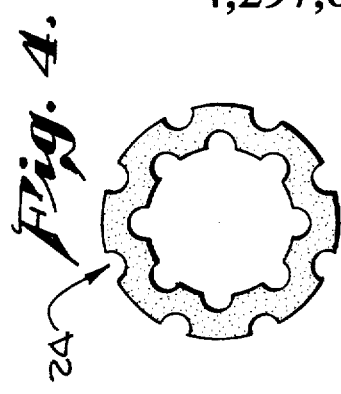
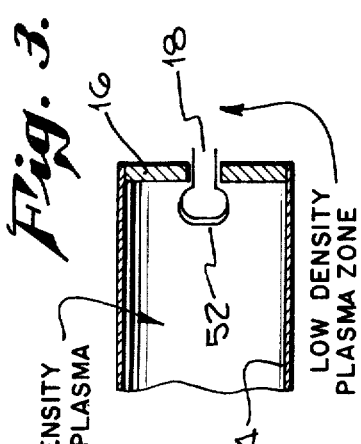
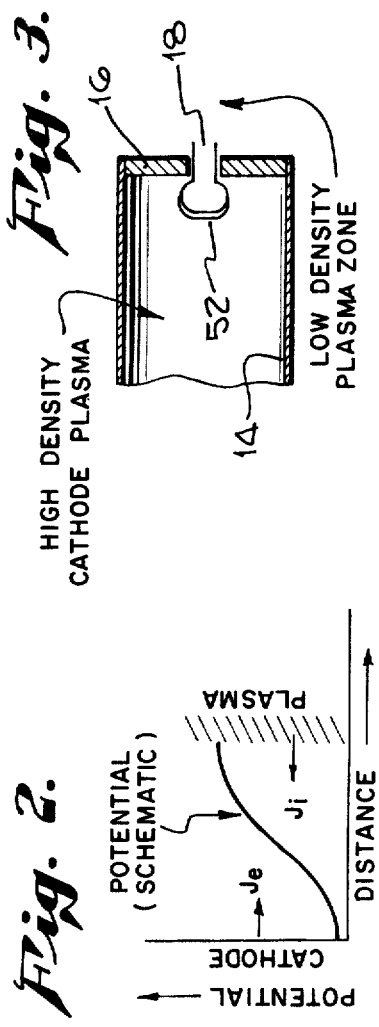

4,297,615

HIGH CURRENT DENSITY CATHODE STRUCTURE

The Government has rights in this invention pursuant to grant No. ENG-17032 awarded by the National Science Foundation.

FIELD OF THE INVENTION

This invention relates to cathode structures for providing very high currents and very high current densities.

BACKGROUND OF THE INVENTION

In the generation of dense plasmas, it is customary to use tungsten hairpin type filaments, oxide coatings, or various very broad area cathode configurations to produce the necessary ionizing electrons. Such known plasma cathodes have significant drawbacks or shortcomings. Tungsten hairpin filaments, for example, require large amounts of power, are fragile after heating, and have a limited lifetime. Oxide cathode coatings deteriorate upon exposure to air after use, and are subject to destruction by ion bombardment in dense plasmas. Very broad area cathodes have been proposed in order to achieve the high discharge currents required to produce high density plasmas, but these are wasteful of space and materials.

It has been proposed heretofore to use lanthanum hexaboride as a cathode material. In this connection reference is made to "Boride Cathodes" by J. M. Lafferty, Journal of Applied Physics, Vol. 22 No. 3, March 1951; "Press Sintered Hexaboride Cathodes" by W. Wolski, U. N. Fellowship Studies, No. 69–12, Royal Institute of Technology in Stockholm, Sweden, May 24, 1969; and N. V. Pleshivtsev U.S. Pat. No. 3,798,488. However, despite the known very high current densities which are available from lanthanum hexaboride ($LaB_6$), the difficulties involved with working with this substance has led most potential users to avoid its use. For example, U.S. Pat. No. 3,798,488 discloses a coating of lanthanum hexaboride on tantalum. Our research indicates that direct contact of the lanthanum hexaboride with tantalum or other refractories including tungsten, causes the embrittlement of the refractory by the migration of boron and the formation of boron-tantalum or other boron-refractory materials, so that the cathode and support structure may have a lifetime of only about 48 hours; and this is confirmed in the patent. Also, the lanthanum is active and will react with other materials such as molybdenum which are frequently used in cathode structures, and cause their failure. In one instance, lanthanum-molybdenum compounds which are formed within the cathode enclosure, even where the molybdenum was spaced from the lanthanum hexaboride, caused failure of the cathode device by the coating of this compound on the cathode and other surfaces within the cathode enclosure, within about 10 hours, using hydrogen as the gas plasma.

Also, at least one authority has indicated that exposure to oxygen is harmful to emissivity. Thus, while the high emissivity properties of lanthanum hexaboride were known, the practical difficulties of using the material, and particularly the adverse reaction with refractories, both in engagement with, and merely exposed near, the cathode, has led those skilled in the art to avoid the material, on the basis that the cathode structure was likely to be very short lived.

Turning to a different phase of the problem, independently of the emitting material chosen, an upper bound on the cathode current is set by the parameters of the surrounding plasma. Under space charge limited conditions, as will be developed in considerable detail in the present specification, the emission current density is proportional to the local plasma density (and to the square root of the electron temperature), Since hundreds of amperes of electron current may be required independent of the local plasma parameters, large area cathodes emitting low current densities have been used in conventional plasma generation designs. These large areas represent a major plasma loss area and have the drawbacks of the conventional cathodes mentioned earlier.

By way of specific example, a typical utilization application might involve a plasma density in the order of $2 \times 10^{12}$ electrons per cubic centimeter, and this would be much lower or zero during initial or start-up conditions. The maximum current which can be drawn from the surface of a cathode when exposed to a plasma having a density of $2 \times 10^{12}$ electrons, is approximately 5.8 or about 6 amperes per square centimeter, for a typical electron temperature of about three electron volts. For the cathode materials which have generally been used up to the present time, their electron-emitting capability is in the order of a few amperes per square centimeter; accordingly, the relatively low plasma density in the order of $2 \times 10^{12}$ electrons per cubic centimeter presented no significant problem.

Lanthanum hexaboride has the capability of emitting very high electron current densities, in excess of 40 amperes per square centimeter, with low evaporation rates. The space charge limitations on compact cathodes using this material becomes critical and an aspect of the invention involves the recognition that special steps must be taken to regulate the plasma density in the vicinity of the lanthanum hexaboride independently of the plasma in the utilization chamber.

Accordingly, one object of the present invention is to utilize the high current emitting capabilities of lanthanum hexaboride to construct compact, high current density cathode structures that are independent of the parameters of the utilized plasma.

Another object of the present invention is to provide a long life geometry for supporting and enclosing a cathode utilizing lanthanum hexaboride as the active emitting element.

SUMMARY OF THE INVENTION

In accordance with one aspect of the present invention, an element of lanthanum hexaboride is mounted in a high plasma density cathode enclosure, and is coupled to a lower plasma density utilization chamber through one or more openings or apertures which are suitably restricted to maintain the plasma density in the cathode enclosure above the critical level for the desired current density from the lanthanum hexaboride.

In accordance with a more specific feature of the invention, the plasma density within the cathode enclosure should be greater than approximately $3.5 \times 10^{12}$ electrons per cubic centimeter in order to permit current densities from the lanthanum hexaboride cathode element greater than 10 amperes per square centimeter. Further, proportional increases in plasma densities will permit proportionally higher cathode current densities, and it is contemplated that plasma densities of $10^{13}$ and $10^{14}$ electrons per cubic centimeter may be employed to permit cathode current densities of 50 amperes per square centimeter, or more.

In accordance with a broad aspect of the invention, a cathode having electron emissivity capabilities of more than 10 amperes per square centimeter is mounted in a high plasma density cathode enclosure, and is coupled to a lower plasma density utilization structure, and arrangements are provided between the cathode enclosure and the utilization structure to maintain the plasma density within the cathode enclosure above the critical level required for maintaining the desired cathode electron emission.

In accordance with other features of the inventions, the lanthanum hexaboride element may be cylindrical in form, it may be mounted on rings of graphite, and the cathode enclosure may be formed of tungsten, all to accommodate and reduce the effect of the lanthanum hexaboride in reducing the mechanical strength of associated elements of the structure.

Advantages of the present invention include the provision of an economical, long-lasting, and very compact cathode structure and one which may be exposed to air without adverse effect. Another very important advantage of the invention is the capability of producing an exceedingly high current, and an exceedingly high current density with such a cathode structure.

Other objects, features and advantages of the present invention will become apparent from a consideration of the following detailed description and from the accompanying drawings.

BRIEF DESCRIPTION OF THE DRAWINGS

FIG. 1 is a schematic showing of a cathode structure illustrating the principles of the present invention;

FIG. 2 is a schematic potential diagram at the interface between the cathode surface and the plasma;

FIG. 3 is a diagram showing the double sheath region at the aperture of the apparatus of FIG. 1, where the high and low density plasmas meet; and FIG. 4 is a side view of one of the cathode supporting elements.

DETAILED DESCRIPTION

Referring more particularly to the drawings, FIG. 1 shows a cathode enclosure 12 which has an outer cylindrical tungsten shell 14, and a tungsten end plate 16 having an aperture 18 through which electrons or a plasma jet streams into the lower denslty plasma utilization chamber 20.

A cylindrical lanthanum boride element 22 is mounted from the tungsten wall 14 by notched graphite support rings 24 and 26. The lanthanum boride emitter 22 is indirectly heated by the non-inductive tungsten heater 28, which is supported within the lanthanum boride cylinder 22 by the conducting rods 30, which may be made of tungsten or other material which will not react with the vapor from the lanthanum boride. The two heater input leads pass through the two alumina cylinders 32 and are electrically connected to the heater power supply 34. The stainless steel support 36 may be water cooled, as indicated by the tubes 38.

Gas is supplied to the cathode enclosure through the tube 40.

The plasma utilization structure includes an anode indicated schematically at 42, and gas from the plasma is ultimately drawn off from the enclosure 20 as indicated by the arrow 44. Incidentally, the apparatus may, for example, be producing a plasma which is to be used for hydrogen fusion research, or argon gas may be used to form an intense plasma beam which is used as a torch for welding purposes, or the like.

Now, turning to the theoretical aspects of the present invention, an upper bound on the cathode current density is set by the parameters of the surrounding plasma. If the current is space charge limited, rather than thermally limited, there is a double sheath between the hot cathode and the surrounding plasma, and from certain relationships developed in the early literature, it can be shown that the maximum cathode current for a given set of parameters is a substantially linear function of the density of the plasma. This function is as follows:

$$J_e = (k/2) n_0 e (KT_e/m_e)^{\frac{1}{2}} \qquad (1)$$

In the foregoing expression, the current density from a unit area of the cathode is represented by $J_e$, k is a dimensionless constant which depends on plasma parameters, $n_0$ is the plasma electron density in the vicinity of the cathode, e is the electron charge which is $1.6 \times 10^{-19}$ coulombs, $Kt_e/e$ is the plasma electron temperature in electron volts, which ranges from about 2 to 6 for different plasmas, and e/m is about $1.76 \times 10^{11}$ coulombs per kilogram. Now, using the MKS system of units, and assuming a current density of 10 amperes per square centimeter, or $10^5$ amperes per square meter, $k \times \frac{1}{2}$ and a value of $KT_e/e$ of about 3 volts, the plasma density $n_0$ comes out to be about $3.5 \times 10^{12}$ electrons per cubic centimeter. Under conditions for which we have tested the device, the plasma density required or desired in the plasma utilization chamber 20 of FIG. 1 is in the order of $2 \times 10^{12}$ electrons per cubic centimeter. If such a charge density were present at the surface of the cathode 22, in FIG. 1, we would not be able to obtain a current density from the cathode of 10 amperes per square centimeter, but only between 5 and 6, amperes per square centimeter. Further, lanthanum hexaboride is capable of producing currents of 50 or more amperes per square centimeter. In view of the linear relationship between $J_e$ and $n_0$ as set forth in equation (1), the plasma density within the chamber 12 should be in the order of $1.75 \times 10^{13}$ electrons per cubic centimeter in order to obtain the desired higher cathode current density. This is of course much higher than the $2 \times 10^{12}$ electrons per cubic centimeter present in the chamber 20.

In order to obtain the differential density between the cathode enclosure 12 and the utilization chamber 20, the relatively small aperture 18 is provided, and the gas flow is adjusted and coordinated with the size of aperture 18, to obtain the desired higher gas pressure and therefore plasma density within the chamber 12.

Although the dimensions are not critical, for convenience, it is noted that the length of the lanthanumm hexaboride cylinder 22 is 4 centimeters and its outer diameter is 2.54 centimeters with an inner diameter of 2.2 centimeters. The diameter of the chamber 14 is approximately 4 centimeters, and the graphite rings 24 and 26 have a series of notches in their outer and their inner peripheries to permit free flow of the plasma past these graphite rings. The system was tested both with hydrogen gas and with argon gas being fed through the gas inlet tube 40. With argon gas, the anode potential was 50 volts, and with hydrogen gas, the anode potential was 80 volts, with the cathode 22 being grounded. The potential within the cathode enclosure was determined using a Langmuir probe, and was found to be about 20 volts in argon and above 30 volts in hydrogen.

FIG. 2 is a diagram of the potential distribution between the surface of the cathode 22 and the plasma within the cylinder 14. The cathode potential is ground, as mentioned above, and the plasma potential may vary but, as noted above, for argon and hydrogen, the plasma potential was about 20 and 30 volts, respectively.

In operation with a single aperture, a very bright nearly hemispherical region of plasma, essentially the diameter of the aperture 18, is observed immediately in front of the hole, on the lower plasma density side of the aperture. The electrons from the cathode form a stream, approximately 1 centimeter in diameter, which propagates several centimeters before diffusing.

The voltage throughout most of the plasma within the cylinder 14 is approximately the same, and is relatively low, in the order of 20 or 30 volts, as mentioned above. Similarly, the voltage throughout the plasma in the utilization apparatus 20 is approximately the same and is very close to the anode potential of 50 or 80 volts. A doulbe sheath 52 is shown in FIG. 3 in the vicinity of the aperture 18. Under conditions for which the plasma density in the aperture is greater than that on either side, more than one double sheath may be present. This plasma sheath or sheaths 52 accompanies the change in the voltage between the lower density region to the right of the aperture 18, and the higher density plasma within the cylinder 14. The potential profile in the sheath or sheaths will be similar to that of the cathode sheath, as shown in FIG. 2.

It has been observed in the operation of the cathode that the tungsten aperture plate, and particularly the region around the aperture itself, becomes much hotter than the rest of the cathode, approaching white heat. This is probably due to ion bobmardment from the very intense plasma existing in the aperture region.

Measurements were made without the aperture plate, with up to 160 amperes discharge current, corresponding to about 5 amperes per square centimeter. The temperature at this current density was measured at 1550 degrees C. The chamber pressure at this current was $1 \times 10^{-4}$ torr, and the anode voltage was approximately 35 volts. At a chamber pressure of $1 \times 10^{-4}$ torr, no more than 180 amperes could be extracted from the cathode in argon, and no more than 30 amperes is hydrogen at $5 \times 10^{-3}$ torr, without the aperture plate in place.

The cathode has been tested with a variety of apertures in both argon and hydrogen. In argon, with a 0.64 centimeter diameter circular aperture, a current of 800 amperes has been extracted from the cathode. This corresponds to a current density at the lanthanum hexaboride cathode surface of 26.7 amperes per square centimeter, assuming uniform emission from the entire cathode surface, and a current density of 2500 amperes per square centimeter in the aperture. The chamber pressure was $3 \times 10^{-4}$ torr, and the gas throughput was 0.45 torr liters per second, from which a gas pressure of $5.6 \times 10^{-2}$ torr was calculated to be present in the hollow cathode region. More current might have been extracted from the cathode, but the power supply which was used, was limited to 800 amperes.

In hydrogen, a smaller aperture is necessary to maintain gas pressure in the cathode enclosure at or above the described levels. Testing with an aperture of 0.32 centimeter diameter produced currents of 500 amperes, or 16.7 amperes per square centimeter at the lanthanum hexaboride cathode surface, and 6200 amperes per square centimeter in the aperture. The anode voltage in hydrogen was near 80 volts and the chamber pressure outside the aperture was $1 \times 10^{-2}$ torr, with a calculated pressure within the cathode enclosure being approximately 1.1 torr.

The cathode has been operated for over 300 hours at temperatures averaging about 1700 degrees C. and has been exposed to air after operation more than 100 times. There has been no deterioration in emission properties observed and no special heat treatment and startup procedures are employed. Careful measurements indicate that the lanthanum hexaboride has lost only about $6.3 \times 10^{-3}$ centimeters uniformly from all surfaces exposed to the plasma, which is far less than expected from calculated evaporation rates. If evaporation is the primary failure mechanism, the cathode should operate for approximately 3800 hours.

FIG. 4 is a side view of one of the graphite supporting rings 24 showing the notches in its inner and outer periphery to permit free circulation of the plasma.

For completeness, reference is made to certain additional prior art references. These include the early article by I. Langmuir, which appeared in the Physical Review, Volume 23, page 140, 1929; page 502 of the Handbook of Materials and Techniques for Vacuum Devices, by W. H. Kohl, Reinhold, New York, 1967, which states that the emission of lanthanum hexaboride deteriorates rapidly on exposure to oxygen or hydrogen at a pressure of $10^{-7}$ torr; and U.S. Pat. Nos. 3,440,475 and 3,928,783, which both disclose the use of solid lanthanum hexaboride cathodes.

In conclusion, it is to be understood that the foregoing detailed description and the accompanying drawings merely show one illustrative form of the invention, and that other arrangements are within the scope of the invention. Thus, by way of example and not of limitation, the aperture plate may be provided with two or more smaller or different shaped apertures or slots instead of the single circular aperture shown herein. Also, other gases may be employed instead of the argon and hydrogen discussed herein. As another alternative, the cathode enclosure may be a hollow cone of solid lanthanum hexaboride material, with the outer end of the cone cut off to provide an aperture for coupling to a lower pressure plasma utilization chamber. It is also noted that the present invention facilitates system start-up, when very low plasma densities may be present in a plasma utilization system. Accordingly, the foregoing description and accompanying drawings are merely to be considered as illustrative of the invention and not as limiting.

What is claimed is:

1. A system including a compact cathode assembly having high electron emission current densities for producing a dense gas plasma, comprising:

a high plasma density cathode enclosure;

inlet means connected to said cathode enclosure for supplying gas to said cathode enclosure;

a low plasma density utilization chamber coupled to receive plasma from said cathode enclosure through a restricted opening between said enclosure and said chamber;

a cathode element of lanthanum hexaboride having an emitting surface exposed within said cathode enclosure;

means for heating said lanthanum hexaboride element to an elevated temperature from a surface of said lanthanum hexaboride away from the emitting surface, whereby contamination of said emitting surface is avoided;

said system including means for establishing a high plasma density, in the order of $2 \times 10^{12}$ electrons per cubic centimeter or more, within said cathode enclosure, substantially higher than in said utilization chamber;

power supply means for drawing current densities greater than five amperes per square centimeter from the emitting surface of said lanthanum hexaboride cathode; and means for mounting said lanthanum hexaboride cathode on carbon material support arrangements.

2. A system as defined in claim 1 wherein said cathode element is a hollow cylinder of solid lanthanum hexaboride.

3. A system as defined in claim 2 wherein said inlet means includes means for supplying gas to the inside of said cylinder, at one end thereof.

4. A system as defined in claim 3 wherein said opening is substantially aligned with said cylinder and is spaced away from said cylinder in the opposite direction from said inlet.

5. A system as defined in claim 1 including means for establishing a plasma density within said cathode enclosure above the critical level permitting cathode electron current densities of 20 amperes per square centimeter.

6. A system as defined in claim 1 wherein the walls of said cathode enclosure are of tungsten.

7. A system as defined in claim 1 wherein said cathode element is a hollow cylinder of solid lanthanum hexaboride and wherein notched carbon rings are provided for physically mounting said cylinder.

8. A system as defined in claim 1 wherein means are provided for producing a current density of more than ten amperes per square centimeter from the emitting surface of the lanthanum hexaboride cathode element.

9. A compact cathode assembly having high electron emission current densities for producing a dense gas plasma, comprising:

a high plasma density cathode enclosure, inlet means connected to said cathode enclosure for supplying gas to said cathode enclosure;

a low plasma density utilization chamber coupled to receive plasma from said cathode enclosure through an aperture between said enclosure and said chamber;

a lanthanum hexaboride cathode element having an electron emissivity of more than 10 amperes per square centimeter mounted within said cathode enclosure between said inlet means and said aperture;

means for heating said cathode element to an elevated temperature without contaminating the electron emitting surface of said cathode element; and said system including means for providing a much higher plasma density within said cathode enclosure than in said utilization chamber, said higher plasma density being above the critical level required to support a cathode electron emission density of ten amperes per square centimeter.

10. A system as defined in claim 9 wherein said cathode element is a hollow cylinder of solid lanthanum hexaboride.

11. A system including a compact cathode assembly having high electron emission current densities for producing a dense gas plasma, comprising:

a high plasma density cathode enclosure;

inlet means connected to said cathode enclosure for supplying gas to said cathode enclosure;

a hollow cylindrical cathode element of solid lanthanum hexaboride, said cathode element having an electron emitting surface;

means including at least two carbon rings having inner and outer peripheral notches, for mounting said cylindrical cathode within said cathode enclosure;

means for heating said lanthanum hexaboride element to an elevated temperature without contaminating said electron emitting surface; and said system including means for producing a current density of more than ten amperes per square centimeter at the surface of the lanthanum boride element, said means including means for establishing a plasma density within said cathode enclosure above the critical level permitting cathode electron current densities of ten amperes per square centimeter.

12. A system as defined in claim 11 wherein the walls of said cathode enclosure are of tungsten.

13. A system as defined in claim 11 further comprising a low plasma density utilization chamber coupled to said cathode enclosure through a restricted aperture.

14. A cathode system comprising:

a cathode element of lanthanum hexaboride having an electron emitting surface;

means for heating said cathode to electron emitting temperatures without contaminating said electron emitting surface;

means for establishing a gas plasma density in the vicinity of said electron emitting surface having an electron density in the order of $2 \times 10^{12}$ electrons per cubic centimeter or more;

means for supporting said cathode with only carbonaceous material in engagement with said cathode; and power supply means for drawing current densities greater than 5 amperes per square centimeter from said emitting surface of said cathode.

15. A cathode system as defined in claim 14 including means for establishing a plasma having an electron density near said cathode equal to or greater than $3.5 \times 10^{12}$ electrons per cubic centimeter, and power supply means for drawing current densities greater than 10 amperes per square centimeter from said emitting surface of said lanthanum hexaboride cathode.

16. A system as set forth in claim 1, 9, or 13 including means for providing a current density in the order of 2500 amperes per square centimeter or more at the opening or aperture between said cathode enclosure and the utilization chamber.

* * * * *